United States Patent
Schwartz et al.

(10) Patent No.: US 10,399,696 B2
(45) Date of Patent: Sep. 3, 2019

(54) AIRCRAFT PILOT DISPLAY SYSTEM AND METHOD OF USE

(71) Applicant: THE BOEING COMPANY, Chicago, IL (US)

(72) Inventors: Samantha Schwartz, Castle Pines, CO (US); Katie M. Reid, Englewood, CO (US)

(73) Assignee: THE BOEING COMPANY, Chicago, IL (US)

( * ) Notice: Subject to any disclaimer, the term of this patent is extended or adjusted under 35 U.S.C. 154(b) by 313 days.

(21) Appl. No.: 15/252,994

(22) Filed: Aug. 31, 2016

(65) Prior Publication Data

US 2018/0057187 A1    Mar. 1, 2018

(51) Int. Cl.
| | | |
|---|---|---|
| G08G 5/00 | (2006.01) | |
| B64C 13/04 | (2006.01) | |
| B64D 43/00 | (2006.01) | |
| B64D 45/00 | (2006.01) | |
| G01C 23/00 | (2006.01) | |

(52) U.S. Cl.
CPC .............. *B64D 43/00* (2013.01); *B64C 13/04* (2013.01); *B64D 45/0005* (2013.01); *G01C 23/00* (2013.01); *G08G 5/0021* (2013.01); *G08G 5/0065* (2013.01)

(58) Field of Classification Search
CPC ... B60T 8/1703; B60T 8/17551; G01B 11/26; G02B 2027/0154; G02B 27/01; G02B 27/0149; B64C 19/00; B64C 39/024; B64C 39/08; B64C 5/10
See application file for complete search history.

(56) References Cited

U.S. PATENT DOCUMENTS

| | | | | | |
|---|---|---|---|---|---|
| 3,574,283 | A | * | 4/1971 | Albers | G01S 1/02 340/980 |
| 3,837,603 | A | * | 9/1974 | Schultz | G05D 1/0202 244/184 |
| 4,006,632 | A | * | 2/1977 | Saverio | G01C 19/04 73/178 R |
| 4,172,632 | A | * | 10/1979 | Holmes, Jr. | G02B 27/2207 340/972 |
| 4,313,726 | A | * | 2/1982 | Chase | G09B 9/302 434/42 |
| 4,330,212 | A | * | 5/1982 | Miller | G01C 15/002 356/138 |

(Continued)

FOREIGN PATENT DOCUMENTS

EP    2600330 A1    6/2013

OTHER PUBLICATIONS

Extended European Search Report for Application No. 17177594.3, dated Jan. 5, 2018, 9 pages.

*Primary Examiner* — Fekadeselassie Girma
(74) *Attorney, Agent, or Firm* — Armstrong Teasdale LLP (57) ABSTRACT

A yaw feedback system for use by an aircraft is provided. The yaw feedback system includes a processor, a runway centerline indicator, and a yaw feedback indicator. The processor is configured to determine a yaw difference between a current track of the aircraft and a runway centerline. The runway centerline indicator is configured to virtually extend a runway visual range (RVR) for a pilot of the aircraft. The yaw feedback indicator is coupled to the processor and configured to prompt the pilot for a yaw input to compensate for the yaw difference.

20 Claims, 7 Drawing Sheets

(56) References Cited

U.S. PATENT DOCUMENTS

| | | | | |
|---|---|---|---|---|
| 5,008,825 | A * | 4/1991 | Nadkarni | G05D 1/0083 244/178 |
| 5,212,480 | A * | 5/1993 | Ferro | G09B 9/08 33/330 |
| 5,833,616 | A * | 11/1998 | Gruner | A61B 1/0052 600/462 |
| 6,121,999 | A * | 9/2000 | Schaack | A61B 1/00147 348/135 |
| 6,236,876 | B1 * | 5/2001 | Gruner | A61B 1/0052 600/114 |
| 6,702,229 | B2 | 3/2004 | Anderson et al. | |
| 7,364,121 | B2 | 4/2008 | Firuz et al. | |
| 7,835,829 | B2 | 11/2010 | Villaume et al. | |
| 8,249,806 | B1 * | 8/2012 | McCusker | G01C 23/005 340/972 |
| 8,560,149 | B1 * | 10/2013 | Ganguli | G01C 23/005 701/15 |
| 8,774,986 | B1 | 7/2014 | Theriault et al. | |
| 8,800,912 | B2 * | 8/2014 | Oliver | B64C 29/0033 244/12.4 |
| 9,132,912 | B2 * | 9/2015 | Griffith | B64C 19/00 |
| 9,310,222 | B1 | 4/2016 | Suiter et al. | |
| 9,315,177 | B2 * | 4/2016 | McKay | B60T 8/1703 |
| 2004/0230353 | A1 * | 11/2004 | Villaume | G05D 1/0083 701/3 |
| 2006/0214063 | A1 * | 9/2006 | Firuz | G05D 1/0083 244/175 |
| 2011/0282580 | A1 * | 11/2011 | Mohan | G01C 21/005 701/472 |
| 2013/0261841 | A1 * | 10/2013 | Miyata | G06F 17/00 701/1 |
| 2015/0169273 | A1 * | 6/2015 | Colby | G06F 3/14 701/14 |
| 2016/0023761 | A1 * | 1/2016 | McNally | B64C 39/024 29/407.01 |
| 2016/0176541 | A1 * | 6/2016 | Kneuper | B64D 45/0005 701/3 |
| 2017/0061813 | A1 * | 3/2017 | Tao | G09B 9/08 |

* cited by examiner

AIRCRAFT PILOT DISPLAY SYSTEM AND METHOD OF USE

BACKGROUND

The field of the disclosure relates generally to pilot displays for aircraft and, more specifically, to a pilot display for use during takeoff maneuvers.

Most fixed wing aircraft have well-established performance targets, thresholds, limits, and procedures for various maneuvers. Each aircraft has several defined velocity thresholds during takeoff that guide pilots in making decisions and carrying out maneuvers. These velocity thresholds include a V1 velocity value, above which a takeoff cannot be abandoned without significant danger to the aircraft, crew, and passengers. The V1 value, sometimes referred to as a go/no go value, is defined for a particular aircraft such that risk in continuing with takeoff and flight is lower than risk to the aircraft, crew, and passengers in aborting the takeoff above V1. The V1 value is followed by a VR velocity value at which the aircraft should rotate, i.e., pitch up, to take off.

The time elapsed between the V1 and VR values is often brief, but long enough for a number of failures to occur, under which the pilot will continue the takeoff and flight. One such failure is an engine failure. When a side engine fails between the V1 and VR values, referred to as a V1 cut, the aircraft experiences a loss of port or starboard power and a subsequent corresponding yaw towards the side of the aircraft with the failed engine. Takeoff procedures call for immediate correction before rotation to ensure stable flight after rotation. Such corrections include, among other actions, a yaw correction using the aircraft's rudder to achieve a proper track before rotation. Certain aircraft utilize automated flight control systems to carry out the V1 cut maneuver, while others rely on pilots and their training. A successful V1 cut maneuver is challenging for pilots, particularly in aircraft with limited visuals and attenuated "feel."

BRIEF DESCRIPTION

According to one aspect of the present disclosure, a yaw feedback system for use by an aircraft is provided. The yaw feedback system includes a processor, a runway centerline indicator, and a yaw feedback indicator. The processor is configured to determine a yaw difference between a current track of the aircraft and a runway centerline. The runway centerline indicator is configured to virtually extend a runway visual range (RVR) for a pilot of the aircraft. The yaw feedback indicator is coupled to the processor and configured to prompt the pilot for yaw input to compensate for the yaw difference.

According to another aspect of the present disclosure, a method of prompting a pilot of an aircraft during takeoff is provided. The method includes receiving, by a processor, a plurality of runway centerline positions defining a runway centerline. The method further includes computing, by the processor, a yaw difference between a current track of the aircraft and the runway centerline. The method further includes displaying a runway centerline indicator to virtually extend a runway visual range (RVR) for the pilot. The method further includes displaying a yaw feedback indicator to prompt the pilot for yaw input to compensate for the yaw difference.

According to yet another aspect of the present disclosure, a pilot display system for an aircraft is provided. The pilot display system includes a display controller and a pilot display. The display controller is configured to receive a plurality of runway centerline positions defining a runway centerline. The display controller is further configured to receive a yaw difference between a current track of the aircraft and the runway centerline. The pilot display is coupled to the display controller. The pilot display includes a runway centerline indicator displayed according to the plurality of centerline positions. The pilot display further includes a yaw feedback indicator configured to prompt a pilot of the aircraft for yaw input to compensate for the yaw difference.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
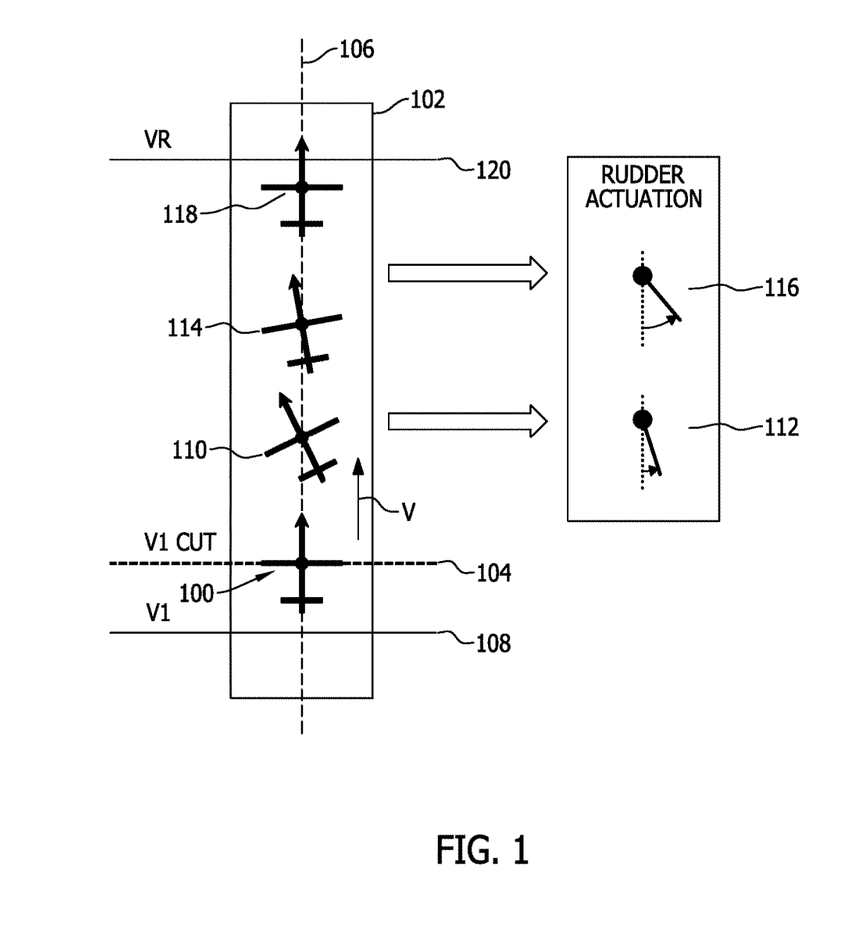
FIG. 1 is a perspective diagram of an exemplary aircraft on a runway during a V1 cut.

FIG. 1 is a perspective diagram of an exemplary aircraft 100 on a runway 102 during a V1 cut 104. During takeoff, aircraft 100 moves along runway 102 with a velocity V and generally tracks along a runway centerline 106. Velocity V reaches V1 velocity at a point on runway 102 depicted as a solid line 108 near the bottom of runway 102 in FIG. 1. Aircraft 100 experiences a V1 cut at a point on runway 102 depicted as a dashed line 104 near the bottom of runway 102. More specifically, in the exemplary embodiment aircraft 100 experiences a port engine failure, resulting in at least some amount of yaw towards the port, or left, side of aircraft 100 as illustrated at aircraft position 110.

In response to the yaw induced by the port engine failure, the pilot applies starboard rudder, as illustrated by rudder actuation 112. Rudder actuation 112 provides corrective yaw, and results in a partially corrected track for aircraft 100, as illustrated at aircraft position 114. Aircraft position 114 also illustrates that initial rudder actuation 112, in certain circumstances, does not fully correct for the port yaw caused by the port engine failure. Consequently, the pilot applies additional starboard rudder, as illustrated by rudder actuation 116 to produce further corrective yaw. Rudder actuation 116 results in a more corrected track for aircraft 100, relative to runway centerline 106, as illustrated by aircraft position 118.

Generally, during a V1 cut, the pilot continuously applies rudder and receives visual feedback as to aircraft 100's track, ultimately in an effort to stabilize aircraft 100's track prior to rotation, at VR velocity, illustrated by solid line 120 near the top of runway 102. VR velocity is defined as the velocity of aircraft 100 at which the pilot should pitch aircraft 100 up for takeoff. FIG. 1 illustrates this process using discrete aircraft positions 110, 114, and 118, and discrete rudder actuations 112 and 116, by way of example.

Figure 2:
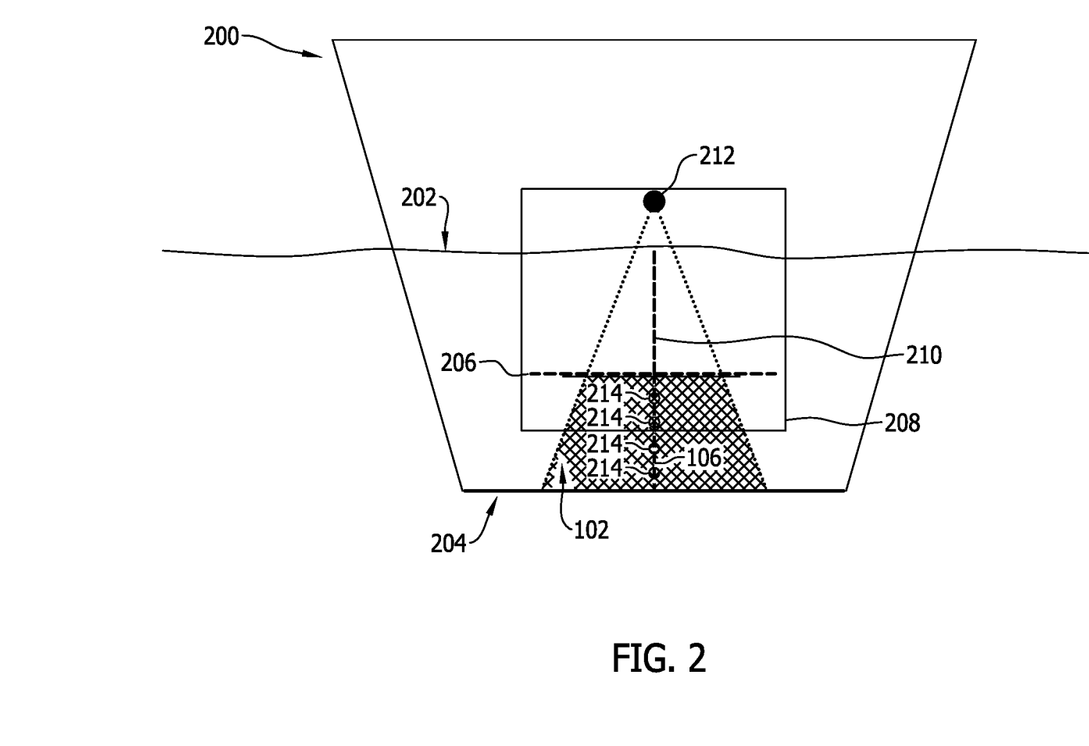
FIG. 2 is an illustration of an exemplary pilot field-of-view from an aircraft during a V1 cut.

FIG. 2 is an illustration of an exemplary pilot field-of-view 200 from aircraft 100 during a V1 cut. Field-of-view 200 includes a horizon 202, and at least a portion of runway 102 and runway centerline 106 (shown in FIG. 1). Runway 102 enters pilot field-of-view 200 just above a glare shield boundary 204, and runway 102 extends to an edge 206, within field-of-view 200. Runway 102 and runway centerline 106 in field-of-view 200 illustrate the runway visual range (RVR) for the pilot during takeoff.

Field-of-view 200 includes a pilot display 208. Pilot display 208 is depicted as a heads-up-display (HUD). In alternative embodiments, pilot display 208 may be any other suitable pilot display, including, for example, and without limitation, an LED display, an LCD, a projection display, visor display, or any other suitable pilot mountable or aircraft mountable displays. Pilot display 208 displays a runway centerline indicator 210 that virtually extends the pilot's RVR during a V1 cut, as if to extend runway 102 out to a pilot focal point 212. Runway centerline indicator 210 is displayed according to a plurality of runway centerline positions 214 that define runway centerline 106.

Figure 3:
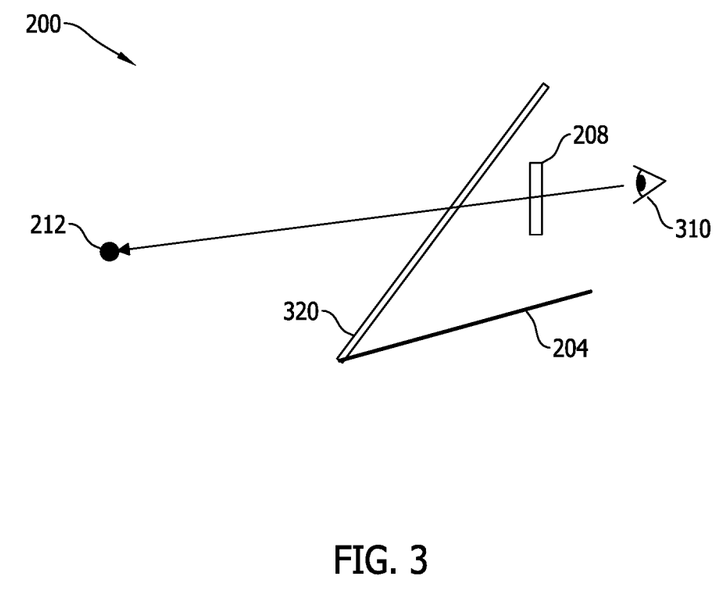
FIG. 3 is a cross-sectional diagram of an exemplary pilot field-of-view from an aircraft during a V1 cut.

FIG. 3 is a cross-sectional diagram of pilot field-of-view 200 from aircraft 100 during a V1 cut. Field-of-view 200 is further illustrated by a pilot 310 and pilot focal point 212 (shown in FIG. 2). Field-of-view 200 is bounded by glare shield 204 (shown in FIG. 2) and pilot visuals through a windshield 320 for aircraft 100. FIG. 3 also illustrates positioning of pilot display 208 relative to pilot 310 and windshield 320.

Figure 4:
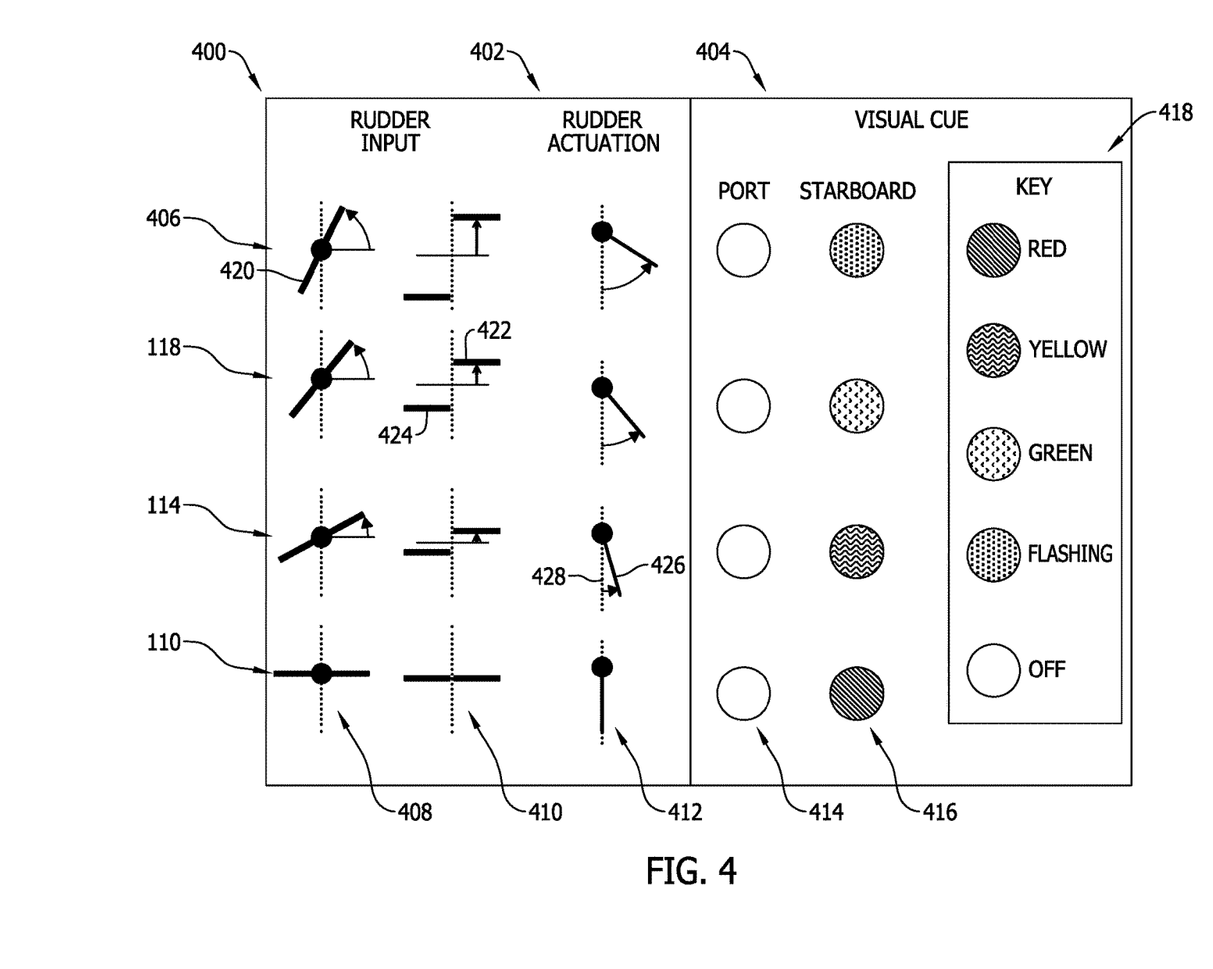
FIG. 4 is a table of rudder commands, rudder actuations, and visual cues for an aircraft during a V1 cut.

FIG. 4 is a table of exemplary rudder inputs 400, rudder actuations 402, and visual cues 404 for aircraft 100 during the V1 cut illustrated in FIG. 1. FIG. 4 illustrates rudder inputs 400, rudder actuations 402, and visual cues 404 for aircraft positions 110, 114, and 118, as well as an aircraft position 406 illustrating an over-correction in yaw.

At aircraft position 110, the port engine failure has occurred and aircraft 100 experiences port yaw before the pilot responds. The pilot provides zero rudder input. Zero rudder input is initially illustrated for a rotary rudder input mechanism 408, and subsequently for a linear rudder input mechanism 410. Zero rudder input corresponds to zero rudder actuation 412. FIG. 4 illustrates only rudder input 400 and rudder actuation 402 from the pilot during the V1 cut. During takeoff and flight, additional rudder input and rudder actuation may be present through other mechanisms, such as, for example, through trim.

Visual cues 404 include colored yaw feedback indicators 414 and 416 that indicate whether port or starboard rudder is needed to correct for yaw induced by the engine failure. FIG. 4 includes a key 418 defining color representations for visual cues 404. At aircraft position 110, aircraft 100 experiences port yaw, zero rudder input, and zero rudder actuation from the pilot. The port yaw calls for starboard rudder for correction. At aircraft position 110, port yaw feedback indicator 414 is off, or not illuminated, and starboard yaw feedback indicator 416 is illuminated in red.

At aircraft position 114, the pilot has commanded some rudder input, illustrated by counter-clockwise movement of a rotary pedal 420 caused by rotary input mechanism 408, upward linear translation of starboard pedal 422 and downward linear translation of port pedal 424 caused by linear rudder input mechanism 410. At aircraft position 114, the rudder input corresponds to rudder actuation 412, illustrated by a counter-clockwise rotation of a rudder 426 relative to an aircraft centerline 428. Rudder actuation 412 at aircraft position 114 partially corrects the port yaw induced by the V1 cut. Yaw feedback indicators 414 and 416 respond accordingly: port yaw feedback indicator 414 remaining off, and starboard yaw feedback indicator 416 changing from red to yellow, indicating additional rudder input is needed.

At aircraft position 118, the pilot has commanded additional rudder input, illustrated by further counter-clockwise rotation of rotary pedal 420 caused by rotary rudder input mechanism 408. The additional rudder input is also illustrated by further upward linear translation of starboard pedal 422 caused by linear rudder input mechanism 410 and further downward linear translation of port pedal 424 caused by linear rudder input mechanism 410. At aircraft position 118, the rudder input corresponds to further rudder actuation 412, illustrated by further counter-clockwise rotation of rudder 426 relative to aircraft centerline 428. Rudder actuation 412 at aircraft position 118 fully corrects the port yaw induced by the V1 cut. Yaw feedback indicators 414 and 416 respond accordingly: port yaw feedback indicator 414 remaining off, and starboard yaw feedback indicator 416 changing from yellow to green, indicating no additional rudder input is needed.

At aircraft position 406, the pilot has commanded additional rudder input, illustrated by further counter-clockwise rotation of rotary pedal 420. The additional rudder input is also illustrated by further upward linear translation of starboard pedal 422 of linear rudder input mechanism 410 and further downward linear translation of port pedal 424 caused by linear rudder input mechanism 410. At aircraft position 406, the rudder input corresponds to further rudder actuation 412, illustrated by further counter-clockwise rotation of rudder 426 relative to aircraft centerline 428. Rudder actuation 412 at aircraft position 406 over-corrects the port yaw induced by the V1 cut. Yaw feedback indicators 414 and 416 respond accordingly: port yaw feedback indicator 414 remaining off, and starboard yaw feedback indicator 416 changing from green to flashing green, yellow, or red, depending on the degree of over-correction. Yaw feedback indicators 414 and 416 at aircraft position 406 indicate starboard rudder input should be reduced.

Figure 5:
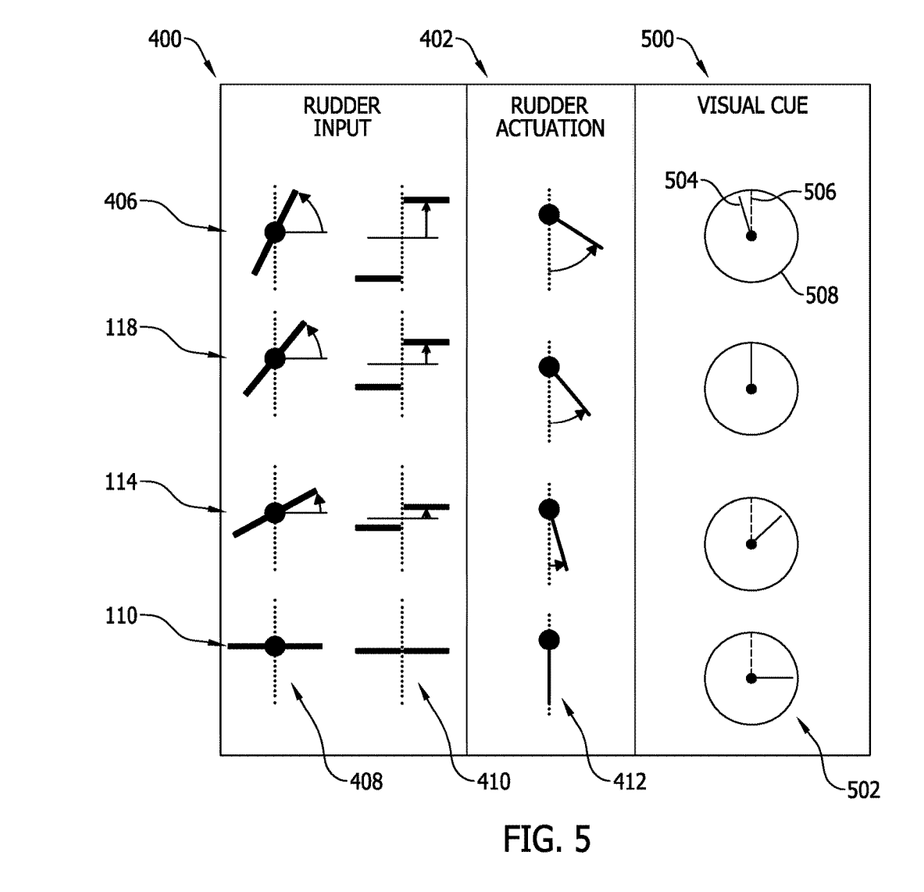
FIG. 5 is another table of rudder commands, rudder actuations, and visual cues for an aircraft during a V1 cut.

FIG. 5 is another table of exemplary rudder inputs 400, rudder actuations 402, and visual cues 500 for aircraft 100 during a V1 cut. FIG. 5 illustrates alternative visual cues 500 for aircraft positions 110, 114, 118, and 406, shown in FIGS. 1 and 4. Visual cues 500 include a yaw feedback indicator 502 indicating yaw feedback using a dial 508 having an indicator element 504 relative to a track line 506.

At aircraft position 110, where aircraft 100 experiences port yaw induced by the V1 cut, zero rudder input 408 and 410 from the pilot, and zero rudder actuation 412, dial 502 indicates starboard rudder is needed by indicator element 504 positioned orthogonal to track line 506, and toward the starboard side of aircraft 100.

Likewise, at aircraft position 114, where rudder input 408 and 410 correspond to some starboard rudder actuation 412, dial 508 indicates additional starboard rudder is needed by indicator element 504 still positioned in the starboard quadrant, but nearer track line 506 as compared to indicator element 504's position at aircraft position 110.

At aircraft position 118, rudder input 408 and 410 correspond to a fully corrective rudder actuation 412. Dial 508 indicates full yaw correction with indicator element 504 overlapping track line 506.

At aircraft position 406, rudder input 408 and 410 correspond to over-correcting rudder actuation 412. Dial 508 indicates the over-correction with indicator element 504 positioned in the port quadrant relative to track line 506.

Figure 6:
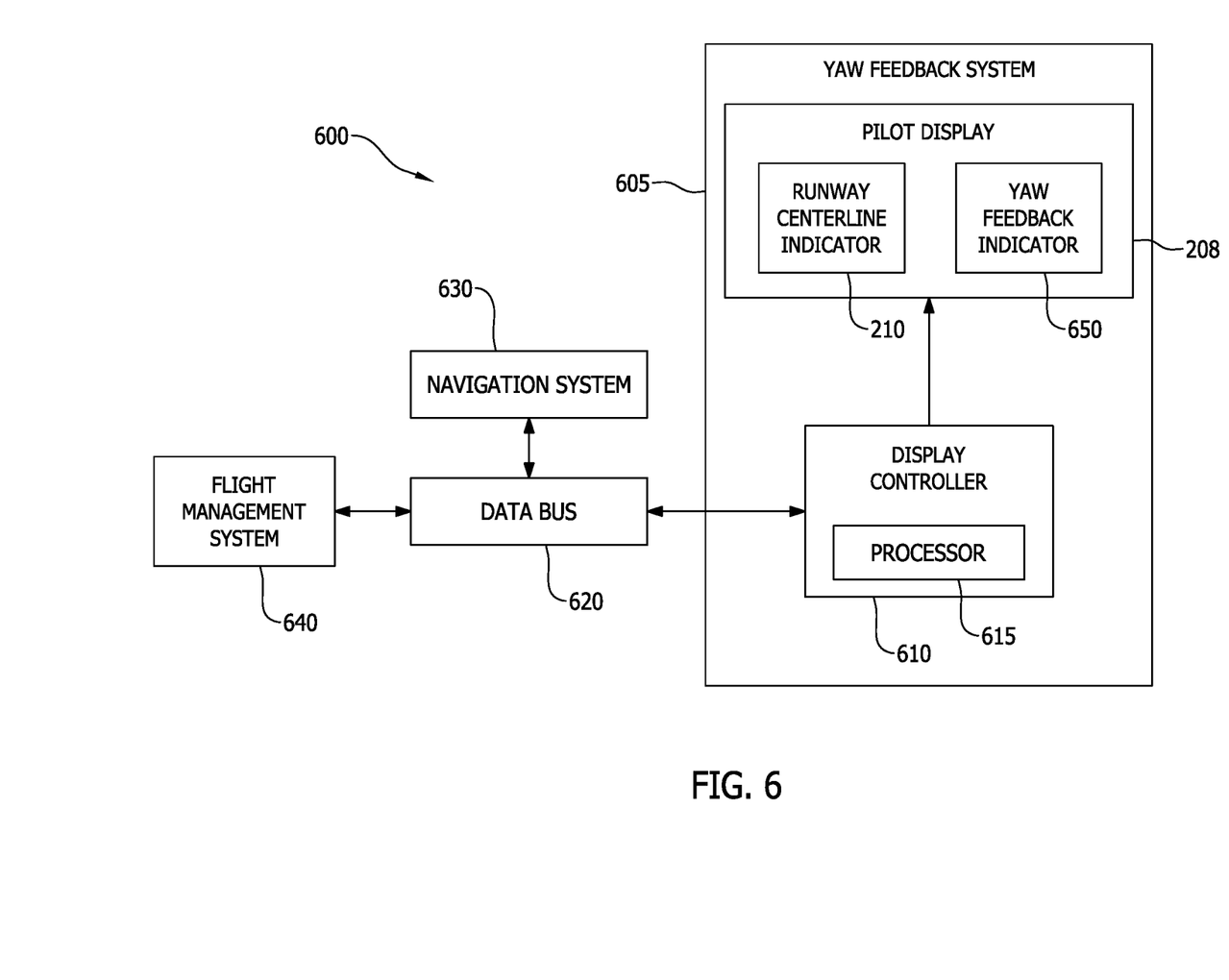
FIG. 6 is a block diagram of an exemplary pilot display system.

FIG. 6 is a block diagram of an exemplary pilot display system 600 for aircraft 100 (shown in FIG. 1). Pilot display system 600 includes a yaw feedback system 605. Yaw feedback system 605 includes pilot display 208 (shown in FIGS. 2 and 3) and a display controller 610. Display controller 610 includes a processor 615 and is coupled to a data bus 620. Data bus 620 includes any suitable aircraft communication link, such as, for example, an ARINC-429 bus. The ARINC-429 bus is a standardized two wire differential bus that communicatively couples a transmitter to one or more receivers. Data bus 620 communicatively couples display controller 610 to various aircraft systems, such as, for example, a navigation system 630 and a flight management system 640.

In certain embodiments, processor 615 determines a yaw difference between a current track of aircraft 100 and runway centerline 106 (shown in FIGS. 1 and 2). Display controller 610 controls pilot display 208 to display runway centerline indicator 210, virtually extending RVR for the pilot. Display controller 610 further controls, using the processor, pilot display 208 to display a yaw feedback indicator 650, such as port and starboard yaw feedback indicators 414 and 416 or dial 508 (shown in FIGS. 4 and 5). Yaw feedback indicator 650 is operable to prompt the pilot for yaw input to compensate for the determined yaw difference between the current track and runway centerline 106.

In one embodiment, yaw feedback indicator 650 includes indicator lights that illuminate in a plurality of colors, such as, for example, port and starboard yaw feedback indicators 414 and 416, otherwise referred to as port indicator light 414 and starboard indicator light 416. Display controller 610 selects which of the plurality of colors to illuminate based on an estimated magnitude of yaw input necessary to compensate for the yaw difference determined based on the current track of aircraft 100 and runway centerline 106. Display controller 610 illuminates port indicator light 414 when prompting for port yaw input, and illuminates starboard indicator light 416 when prompting starboard yaw input.

In another embodiment, yaw feedback indicator 650 includes dial 508 that defines a range of rudder input over which indicator element 504 operates. Indicator element 504 moves relative to track line 506 based on the determined yaw difference.

In certain embodiments, flight management system 640 includes a processor configured to determine the yaw difference between the current track of aircraft 100 and runway centerline 106. Flight management system 640 communicates with display controller 610 over data bus 620 to control display of runway centerline indicator 210 and yaw feedback indicator 650. Flight management system 640 is further configured to compute a yaw input necessary to compensate for the determine yaw difference based on an airspeed of aircraft 100.

In one embodiment, display controller 610 receives plurality of runway centerline positions 214, which define runway centerline 106. Display controller 610 also receives the yaw difference between the current track of aircraft 100 and runway centerline 106. Display controller 610 then controls pilot display 208 to display runway centerline indicator 210 according to plurality of centerline positions 214, and to display yaw feedback indicator 650 to prompt the pilot for yaw input to compensate for the determined yaw difference. In such an embodiment, display controller 610 receives plurality of runway centerline positions 214 and the yaw difference over data bus 620. In certain embodiments, flight management system 640 computes the yaw difference based on plurality of runway centerline positions 214 and the current track. In certain embodiments, navigation system 630 is configured to store plurality of runway centerline positions 214 and transmit those positions to display controller 610 over data bus 620 for display on pilot display 208. In certain embodiments, pilot display 208 includes a HUD for aircraft 100.

Figure 7:
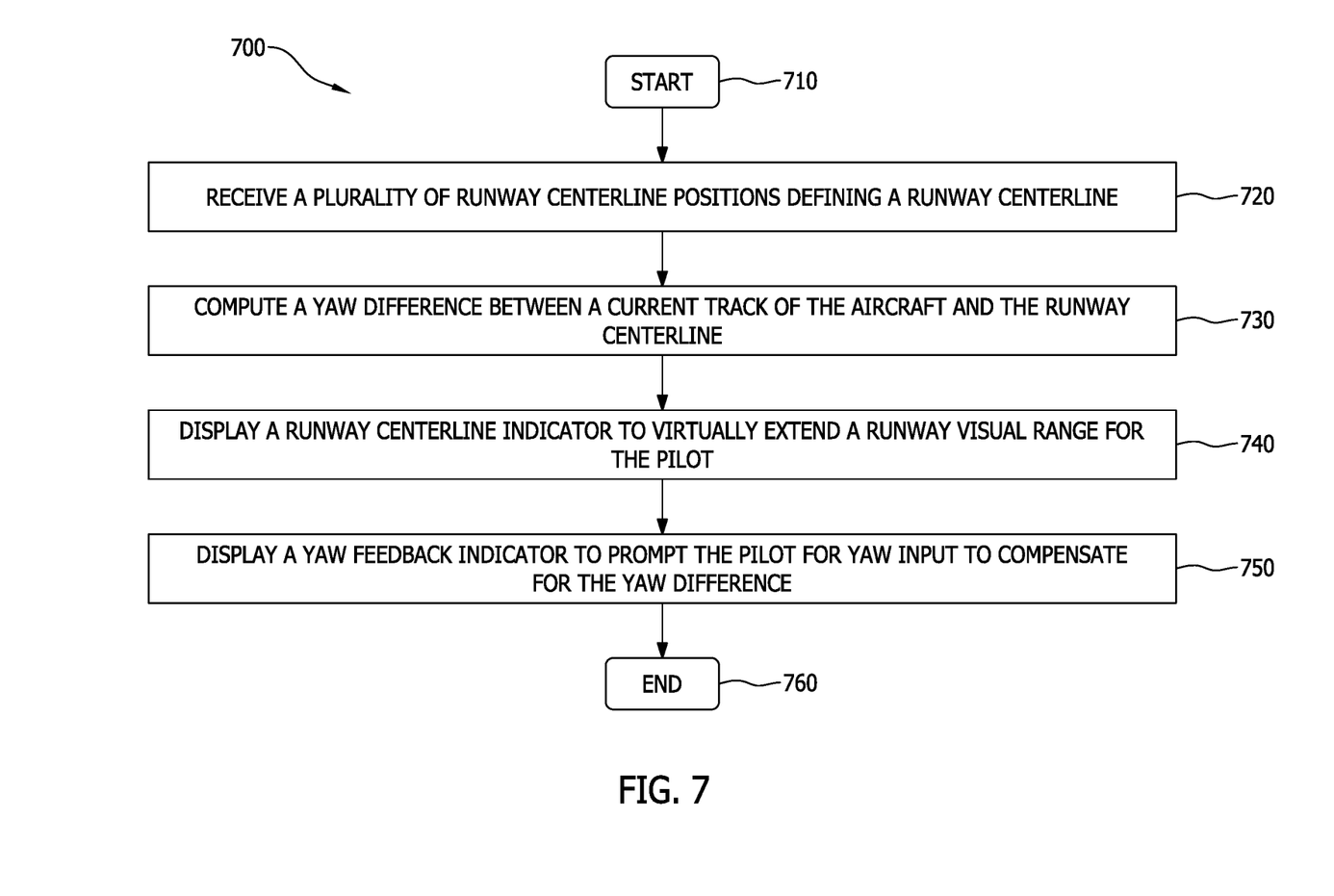
FIG. 7 is a flow diagram of an exemplary method of prompting a pilot of an aircraft during takeoff.

FIG. 7 is a flow diagram of an exemplary method 700 of prompting a pilot of aircraft 100 during takeoff using pilot display system 600 (shown in FIG. 6), for example. Method 700 is initiated 710 and the processor of display controller 610 receives 720 plurality of runway centerline positions 214 that define runway centerline 106. The processor computes 730 a yaw difference between a current track of aircraft 100 and runway centerline 106. In certain embodiments, the current track of aircraft 100 is received over data bus 620 from flight management system 640. In alternative embodiments, display controller 610 receives the determined yaw difference over data bus 620. In such embodiments, the yaw difference is computed by another processor located in flight management system 640, for example.

Runway centerline indicator 210 is displayed 740 on pilot display 208 to virtually extend the RVR for the pilot of aircraft 100. Pilot display 208 is further configured to display 750 yaw feedback indicator 650 to prompt the pilot for yaw input to compensate for the yaw difference.

In certain embodiments, method 700 includes extrapolating, by the processor of display controller 610, plurality of runway centerline positions 214 to render runway centerline indicator 210 on pilot display 208. In certain embodiments, method 700 also includes computing, by the processor, a yaw input necessary to compensate for the determined yaw difference. Such computing includes selecting port yaw input when the yaw difference indicates a current starboard yaw and selecting a starboard yaw input when the yaw difference indicates a current port yaw. Such computing also includes computing a magnitude of yaw input based on the airspeed of aircraft 100, for example. The computed magnitude of yaw input, in certain embodiments, may be incorporated into yaw feedback indicator 650. The method terminates at an end step 760.

The above described embodiments of yaw feedback systems for use by aircraft during takeoff provide pilots visual indicators of yaw in the event of a V1 cut. More specifically, the present disclosure describes a runway centerline indicator that virtually extends runway visual range (RVR) for the pilot, giving the pilot sufficient visual depth-of-field to apply appropriate yaw compensation during the V1 cut. The present disclosure further describes a yaw feedback indicator that prompts the pilot for an appropriate yaw input to compensate for yaw induced by the V1 cut. Such yaw feedback indicators may include dials, indicator lights, or a combination of both, for example. The yaw feedback systems described herein utilize data from a navigation system to ascertain the position of the runway centerline. The yaw feedback systems described herein further utilize data from a flight management system to compute the appropriate yaw compensation. The yaw feedback systems may be implemented, for example, within a HUD system for the aircraft.

Exemplary embodiments of methods, systems, and apparatus for yaw feedback systems are not limited to the specific embodiments described herein, but rather, components of systems and/or steps of the methods may be utilized independently and separately from other components and/or steps described herein. For example, the methods may also be used in combination with other non-conventional yaw feedback systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A yaw feedback system (605) for use by a pilot of an aircraft (100) during takeoff, comprising:
    a processor (615) configured to determine a yaw difference between a current track of the aircraft and a runway centerline (106);
    a runway centerline indicator (210) configured to virtually extend a runway visual range "RVR" for a pilot of the aircraft; and
    a yaw feedback indicator (650) coupled to the processor and configured to prompt the pilot for a yaw input to compensate for the yaw difference, and to convey, to the pilot, a magnitude and a direction of the yaw difference.

2. The yaw feedback system (605) of claim 1, wherein the yaw feedback indicator (650) comprises an indicator light (414,416) operable to illuminate in a plurality of colors, wherein an illuminated color of the indicator light is selected based on an estimated magnitude of yaw input necessary to compensate for the yaw difference.

3. The yaw feedback system (605) of claim 1, wherein the yaw feedback indicator (650) comprises a port indicator light (414) and a starboard indicator light (416), the port indicator light configured to illuminate when prompting the pilot for port yaw input, the starboard indicator light configured to illuminate when prompting the pilot for starboard yaw input.

4. The yaw feedback system (605) of claim 1, wherein the yaw feedback indicator (650) comprises a dial (508) defining a range of rudder input over which an indicator element (504) operates, the dial configured to move the indicator element based on the yaw difference.

5. The yaw feedback system (605) of claim 1, wherein the processor (615) is located within a display controller (610) for a pilot display (208) on which the runway centerline indicator (210) and the yaw feedback indicator (650) are displayed.

6. The yaw feedback system (605) of claim 1, wherein the processor (615) is located within a flight management system (640) coupled to the runway centerline indicator (210) and the yaw feedback indicator (650) through a data bus (620).

7. The yaw feedback system (605) of claim 1, wherein the processor (615) is further configured to compute a yaw input necessary to compensate for the yaw difference based at least on an airspeed of the aircraft (100).

8. A method (700) of prompting a pilot of an aircraft (100) during takeoff, the method comprising:
    receiving (720), by a processor (615), a plurality of runway centerline positions (214) defining a runway centerline (106);
    computing (730), by the processor, a yaw difference between a current track of the aircraft and the runway centerline;
    displaying (740) a runway centerline indicator (210) to virtually extend a runway visual range "RVR" for the pilot; and
    displaying (750) a yaw feedback indicator (650) to prompt the pilot for a yaw input to compensate for the yaw difference, the yaw feedback indicator configured to convey, to the pilot, a magnitude and a direction of the yaw difference.

9. The method (700) of claim 8 further comprising extrapolating, by the processor (615), the plurality of runway centerline positions (214) to render the runway centerline indicator (210) on a pilot display (208).

10. The method (700) of claim 8 further comprising receiving, by the processor (615), the current track of the aircraft from a flight management system (640).

11. The method (700) of claim 8 further comprising computing, by the processor (615), the yaw input necessary to compensate for the yaw difference.

12. The method (700) of claim 11, wherein computing the yaw input comprises:
    selecting port yaw input when the yaw difference indicates a current starboard yaw; and
    selecting starboard yaw input when the yaw difference indicates a current port yaw.

13. The method (700) of claim 11, wherein computing the yaw input comprises computing a magnitude of the yaw input based at least on an airspeed of the aircraft (100).

14. The method (700) of claim 13, wherein the yaw feedback indicator (650) includes a numeric indicator of the magnitude of the yaw input.

15. A pilot display system (600) for an aircraft (100), the pilot display system comprising:
    a display controller (610) configured to:
        receive (720) a plurality of runway centerline positions (214) defining a runway centerline (1.06), and
        compute (730) a yaw difference between a current track of the aircraft and the runway centerline; and
    a pilot display (208) coupled to the display controller, the pilot display comprising:
        a runway centerline indicator (210) displayed according to the plurality of runway centerline positions, and
        a yaw feedback indicator (650) configured to prompt a pilot of the aircraft for a yaw input to compensate for the yaw difference, and to convey, to the pilot, a magnitude and a direction of the yaw difference.

16. The pilot display system (600) of claim 15 further comprising a data bus (620) coupled to the display controller (610) and configured to deliver the runway centerline positions (214) and the yaw difference to the display controller.

17. The pilot display system (600) of claim 16 further comprising a flight management system (640) coupled to the data bus (620) and configured to compute the yaw difference based on the plurality of runway centerline positions (214) and the current track.

18. The pilot display system (600) of claim 16, wherein the data bus (620) is further coupled to a navigation system (630) configured to store the runway centerline positions (214).

19. The pilot display system (600) of claim 15, wherein the pilot display (208) comprises a heads-up-display "HUD" for the aircraft (100).

20. The pilot display system (600) of claim 15, wherein the yaw feedback indicator (650) comprises a dial (508) defining a range of rudder input over which an indicator element (504) operates, the dial configured to move the indicator element based on the yaw difference.

* * * * *

UNITED STATES PATENT AND TRADEMARK OFFICE
CERTIFICATE OF CORRECTION

| | |
|---|---|
| PATENT NO. | : 10,399,696 B2 |
| APPLICATION NO. | : 15/252994 |
| DATED | : September 3, 2019 |
| INVENTOR(S) | : Schwartz et al. |

Page 1 of 1

It is certified that error appears in the above-identified patent and that said Letters Patent is hereby corrected as shown below:

In the Claims

In Column 8, Line 50, Claim 15, delete "(1.06)" and insert therefor -- (106) --.

Signed and Sealed this
Nineteenth Day of November, 2019

Andrei Iancu
*Director of the United States Patent and Trademark Office*